(12) United States Patent
Ehrlich et al.

(10) Patent No.: US 8,590,911 B2
(45) Date of Patent: Nov. 26, 2013

(54) SUSPENSION OF A VEHICLE AXLE AND VEHICLE

(76) Inventors: Dirk Ehrlich, Bodenheim (DE); Oleg Mazur, Nauheim (DE); Juergen Siebeneick, Oberwesel (DE)

(*) Notice: Subject to any disclaimer, the term of this patent is extended or adjusted under 35 U.S.C. 154(b) by 0 days.

(21) Appl. No.: 13/372,757

(22) Filed: Feb. 14, 2012

(65) Prior Publication Data

US 2012/0217715 A1   Aug. 30, 2012

(30) Foreign Application Priority Data

Feb. 24, 2011   (DE) .......................... 10 2011 012 374

(51) Int. Cl.
*B60G 21/05*   (2006.01)

(52) U.S. Cl.
USPC .................................................. 280/124.128

(58) Field of Classification Search
USPC .................... 280/124.128, 124.106, 124.107, 280/124.116, 124.13, 124.129
See application file for complete search history.

(56) References Cited

U.S. PATENT DOCUMENTS

| | | | | |
|---|---|---|---|---|
| 2,689,015 A | * | 9/1954 | Nallinger | 180/353 |
| 2,692,770 A | * | 10/1954 | Nallinger et al. | 267/251 |
| 3,951,225 A | * | 4/1976 | Schwenk | 280/124.116 |
| 8,177,245 B2 | * | 5/2012 | Bitz et al. | 280/124.128 |
| 2011/0031712 A1 | * | 2/2011 | Bitz et al. | 280/124.106 |
| 2012/0217716 A1 | * | 8/2012 | Ehrlich et al. | 280/124.128 |

* cited by examiner

*Primary Examiner* — Faye M. Fleming
(74) *Attorney, Agent, or Firm* — Ingrassia Fisher & Lorenz, P.C.

(57) ABSTRACT

A suspension is provided for a vehicle axle, with a twist-beam axle having two trailing arms interconnected via a cross brace, of which each trailing arm comprises a mounting device for the rotatable fastening of the twist-beam axle to a vehicle body, which includes, but is not limited to a bushing and a connecting element, which is formed on the trailing arm and in which the bushing is received such that the twist-beam axle can be pivoted about the longitudinal axis of the bushing. The bushing is fastened to a holder, which can be connected to the vehicle body, and the bushing with its longitudinal axis is arranged in a horizontal vehicle plane.

16 Claims, 3 Drawing Sheets

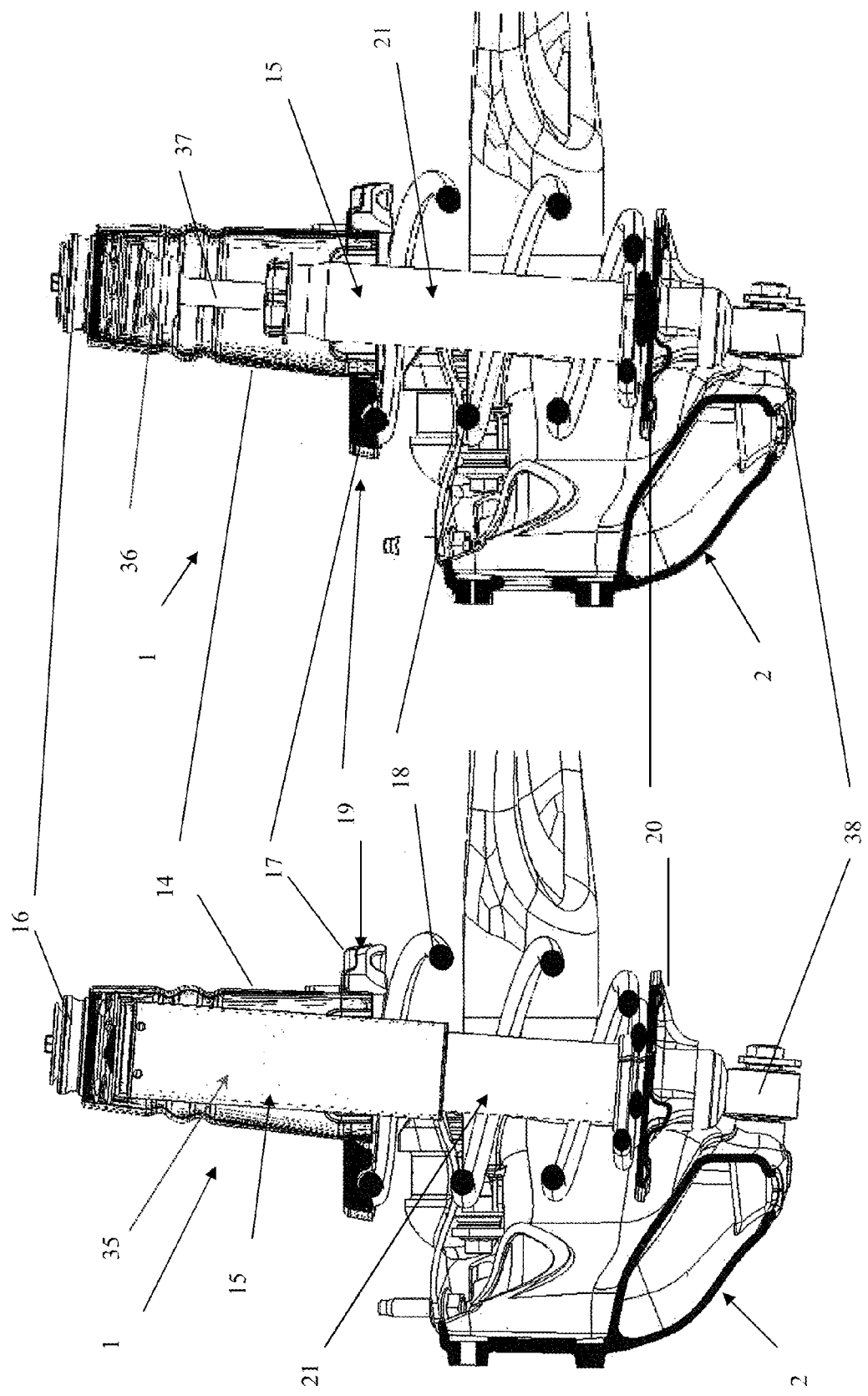

//(1)//

SUSPENSION OF A VEHICLE AXLE AND VEHICLE

CROSS-REFERENCE TO RELATED APPLICATION

This application claims priority to German Patent Application No. 10 2011 012 374.1, filed Feb. 24, 2011, which is incorporated herein by reference in its entirety.

TECHNICAL FIELD

The technical field relates to a suspension of a vehicle axle, for example of a rear axle, and a vehicle with a suspension of this type.

BACKGROUND

German Patent Application DE 10 2006 033 755 A1 describes a wheel suspension wherein unsteered wheels are tied to a motor vehicle body via a twist-beam axle. The twist-beam axle comprises two trailing arms and a brace interconnecting the trailing arms. At one end, the trailing arms connect to the motor vehicle body via mountings. The brace is articulated on the trailing arms between a connection of the wheels on the trailing arms and the mounting. The trailing arms have a section protruding over a connection of the wheels, on which a Watt linkage is articulated.

With previous concepts, a suitable free space between link and body has to provide for the main bearing or the so-called A-bushing, because of which a higher mounting of the main bearing in the body is restricted. Furthermore, Watt linkages have the problem that their holder is relatively solidly and is therefore correspondingly heavy.

In view of the foregoing, it is desirable to improve a suspension of a vehicle axle. In addition, other desirable features and characteristics will become apparent from the subsequent summary and detailed description, and the appended claims, taken in conjunction with the accompanying drawings and this background.

SUMMARY

A suspension of a vehicle axle is provided having a twist-beam axle. The twist-beam axle comprise two trailing arms which are interconnected via a cross brace, and each trailing arm comprises a mounting device for the rotatable fastening of the twist-beam axle to a vehicle body. The mounting device comprises a bushing and a connecting element, which is formed on the trailing arm and in which the bushing is inserted in such a manner that the twist-beam axle can be pivoted about the longitudinal axis of the bushing. The bushing is fastened to a holder, which can be connected to the vehicle body, and the bushing with its longitudinal axis is arranged in a horizontal vehicle plane. A vehicle having a suspension according to an embodiment, at least one vehicle axle.

At least one idea on which the embodiments are based is that through the provision of the mounting device on the trailing arm and through the fastening of the mounting device in a holder of the vehicle body, a stiffer body connection is achievable. In addition, a higher position of the bushing of the mounting device is possible. In that the bushing with its longitudinal axis is arranged in a horizontal vehicle plane, a lateral force understeer can be reduced.

In an embodiment, the trailing arms are connected at their other end to a Watt linkage, which comprises a Watt linkage holder that is designed in particular such as to connect the Watt linkage to a vehicle body cross member. Through the fastening of the Watt linkage holder to the vehicle body cross member the Watt linkage holder can be configured more compact, lighter, and more cost-effective.

In an embodiment, the holder is designed as a sleeve into which the bushing can be pressed from a side and wherein the sleeve can be provided, for example, with at least one reinforcing rib. This has the advantage that the holder and the bushing can be assembled in advance and the twist-beam axle merely needs to be screwed with the holder to the vehicle body thereafter.

In an embodiment, the connecting element is a fork-shaped or U-shaped mount and, for example, designed unitarily with the trailing arm. Such a fork-shaped or U-shaped mount can be advantageously produced in a simple and cost-effective manner.

In an embodiment, the bushings with their longitudinal axis are arranged higher in horizontal direction of the vehicle than an axis through a wheel center of a wheel suspension of the trailing arms. This has the advantage that an improved inclined spring suspension can be achieved since a wheel on travelling over an obstacle can yield to the back.

According to another embodiment, a spring absorber device is fastened to the respective trailing arm, for example, in a point. The spring absorber device is, for example, arranged between the cross member and the axis through the wheel center of the wheel suspension of the trailing arms. Thus, the spring absorber device can lie under the loading floor and a larger through-loading width can be achieved. However, an arrangement behind the axle, which runs through the wheel center of the wheel suspension in the direction of the vehicle rear, is also conceivable, but the spring absorber device becomes longer in this case and can no longer lie under the loading floor.

Through the arrangement of the spring absorber device in the body longitudinal frame the body longitudinal frame can be pushed further to the outside and can receive a larger cross section. Because of this arrangement, the body longitudinal frame can be straightened in top view. Because of this arrangement, a stiffer and simultaneously lighter body structure is achievable.

In another embodiment, the spring absorber device comprises a dome element, in which an absorber with an absorber mounting device is received. The dome element is connected to the absorber mounting device on a first end and can be fastened to the vehicle body by means of the absorber mounting device. At its second end, the dome element comprises a spring seat and can be fastened to the vehicle body with its second end. The absorber furthermore comprises a spring seat. Furthermore, the spring absorber device comprises a spring element, wherein the spring element is received in the spring seat in the dome element and of the absorber.

In a further embodiment, the Watt linkage holder is connected to the central link of the Watt linkage and comprises two arms for fastening to the vehicle body cross member. The arms extend in particular along the vehicle body cross member. The Watt linkage holder has the advantage that it can be designed compact and disturbs the stiffness and natural frequency of the rear vehicle only to a very minor part or not at all. This is important in particular since this wheel suspension also encompasses vehicles without Watt linkage.

According to another embodiment, the cross brace of the twist-beam axle is designed as a torsion profile. The torsion profile is designed stiff to bending and torsionally soft and is produced in particular of a steel tube or a steel plate. The torsionally soft cross brace in this case acts as stabilizer, because of which the curve behavior of the vehicle when travelling through a curve can be substantially improved.

The cross brace or the torsion profile can be fastened to the trailing arms in a predefined position, for which purpose the cross brace or the torsion profile is arranged in the predefined position or turned into the predefined position and then welded to the trailing arms. The predefined position of the cross brace or the torsion profile can be selected dependent on a desired rolling center height and/or rolling control. The cross brace or the torsion profile each has a cylindrical section at their ends in order to be turned, which can be received in a corresponding cylindrical section of the respective trailing arm. The cross brace or the torsion profile is turned into the corresponding predefined position and then fastened to the trailing arms. The cross brace or the torsion profile and their connection to the trailing arms can also be designed in such a manner that they can only be interconnected in one position.

In a further embodiment, the trailing arm is designed unitarily. A multi-part embodiment of the trailing arm would also be conceivable and advantageous. The trailing arm is preferentially produced from gray cast iron, a light metal, e.g., aluminum or an aluminum alloy, and/or from steel plate.

The above configurations and further developments can be combined with one another in any way so far as practical. Further possible configurations, further developments and implementations of the embodiments also comprise combinations of features previously or in the following described with respect to the exemplary embodiments that have not been mentioned explicitly. In particular, the person skilled in the art will also add individual aspects to the respective basic form as improvements or additions.

BRIEF DESCRIPTION OF THE DRAWINGS

The present invention will hereinafter be described in conjunction with the following drawing figures, wherein like numerals denote like elements, and:

FIG. 3 is a sectional view through a spring absorber device of the twist-beam axle according to FIG. 1; and FIG. 4 is the sectional view through the spring absorber device of the twist-beam axle according to FIG. 1.

DETAILED DESCRIPTION

Figure 1:
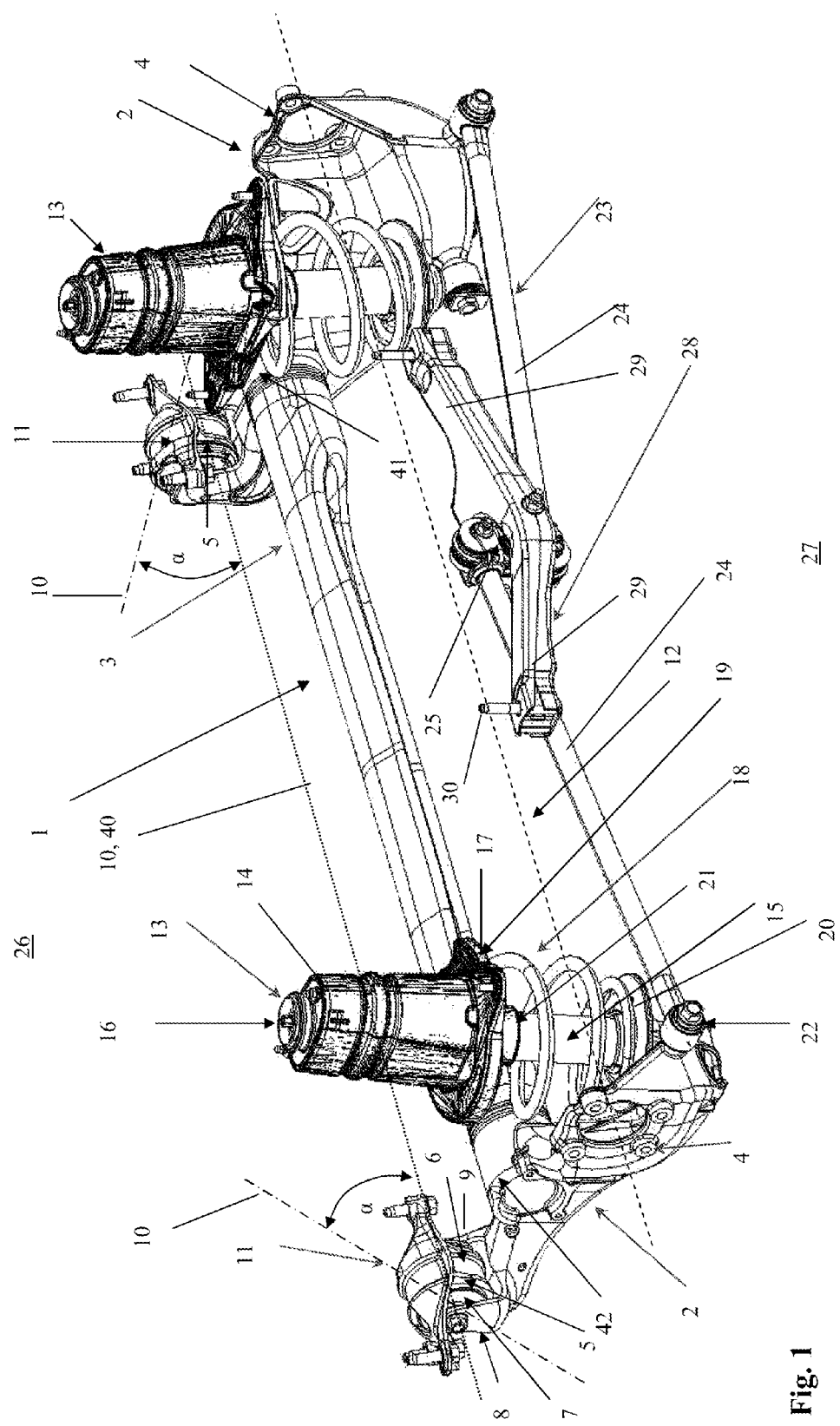
FIG. 1 is a perspective view of a suspension of the a vehicle axle with a twist-beam axle according to an embodiment.

The following detailed description is merely exemplary in nature and is not intended to limit application and uses. Furthermore, there is no intention to be bound by any theory presented in the preceding background or summary or the following detailed description.

The attached drawings serve to impart a further understanding of the embodiments. They illustrate embodiments and in connection with the description serve to explain principles and concepts of the embodiments. Other embodiments and many of the mentioned advantages are obtained with a view to the drawings. The elements of the drawings are not necessarily drawn to scale relative to one another.

In the figures of the drawings, same, functionally same and equally acting elements, features and components, unless otherwise stated, are each provided with the same reference characters.

FIG. 1 shows a perspective view of a suspension of a vehicle axle with a twist-beam axle according to an embodiment. The twist-beam axle 1 comprises two trailing arms 2, in particular rigid trailing arms. The two trailing arms 2 in this case are interconnected through a stiff to bending but torsionally soft cross brace 3. The torsionally soft cross brace 3 in this case acts as stabilizer, because of which the curve behavior of the vehicle can be substantially improved when travelling through a curve. The torsionally soft cross brace 3 in this case is a torsionally yielding torsion profile and the trailing arms 2 are for example stiff to bending and torsionally rigid.

The torsion profile of the cross brace 3 and/or the trailing arms 2 can at least partially or completely be produced as hollow profile or solid profile. Here, the torsion brace 3 can in particular be produced from a steel tube or a steel plate and the trailing arms 2 from a light metal such as for example aluminum, gray cast iron or a steel plate. In addition, the trailing arms 2 for example can each be produced unitarily or in multiple parts.

As is shown in the exemplary embodiment in FIG. 1, the respective first or in this case rear end of the trailing arm 2 can be provided with a wheel carrier or wheel suspension 4 for the rotatable mounting of a vehicle wheel. The wheel suspensions 4 of the trailing arms 2 form a wheel suspension axis 12, which runs through the wheel centers or the center points of the two wheel suspensions 4.

At its second or in this case front end, the trailing arms 2 each have a mounting device, which comprises a bushing or an A-bushing 5, via which the twist-beam axle 1 is connected to the vehicle body. The bushing or A-bushing 5 in this case is embodied for example as rubber-metal bushing, wherein the rubber-metal bushing comprises an outer sleeve 6, e.g. of metal and/or plastic, and an inner sleeve 7, which for example is likewise of metal. Between the outer sleeve 6 and the inner sleeve 7 an additional intermediate layer 39, e.g., a rubber layer, can be optionally arranged as shown in the exemplary embodiment in FIG. 1. However, the invention is not restricted to this specific bushing, any other suitable bushing can also be employed, for example a hydrobushing.

As is illustrated in the exemplary embodiment in FIG. 1, the respective trailing arm 2 is connected to the inner sleeve 7 of the A-bushing 5. To this end, the mounting device comprises a connecting element 8 for example in the form of a fork-shaped or U-shaped mount 9, in which the A-bushing 5 is arranged or received. The connecting element 8 of the mounting device in this case is provided on the trailing arm 2, in this case the end of the trailing arm 2 and for example designed unitarily with the latter. Furthermore, the connecting element 8, in this case for example the fork-shaped mount 9, is pivotably connected to the inner sleeve 7 of the A-bushing 5 on both ends of the latter, so that the twist-beam axle 1 with its trailing arms 2 can be pivoted or rotated about the A-bushing 5 or its longitudinal axis 10. The A-bushing 5, as illustrated in the exemplary embodiment in FIG. 5, is arranged with its longitudinal axis 10 in a horizontal vehicle plane, for example transversely (i.e. perpendicularly or by approximately 90°) to the longitudinal axis of the vehicle. The longitudinal axis 10 of the bushing thus coincides with a transverse axis 40 of the vehicle. As is shown in the exemplary embodiment in FIG. 1, the two A-bushings 5 with their longitudinal axes 10 lie on a common axis (dotted line in FIG. 1). In other words, the two bushings 5 with their longitudinal axes 10 (dotted line in FIG. 1) are coaxial, i.e., they form a common longitudinal or rotary axis 10. The common rotary axis 10 of the bushings 5 in this case lies in a horizontal vehicle plane perpendicularly or by approximately 90° to the vehicle longitudinal axis as described before and thus corresponds to a transverse axis of the vehicle.

As is indicated in FIG. 1 by a dash-dotted line, it is also possible for the longitudinal axes 10 of the two bushings 5 not to form a common rotary axis 10 (dotted line in FIG. 1), but for example be each arranged at an angle α in a horizontal vehicle plane to a transverse axis 40 of the vehicle. The angle α prudentially lies in a range between approximately 15° to approximately 30° and particularly preferably between approximately 25° to approximately 30°. Here, the transverse axis is arranged transversely (i.e., perpendicularly or by approximately 90°) to the longitudinal axis of the vehicle as described above. Both bushings 5 in this case are preferentially arranged with their inner end in the direction of the vehicle front 26 and with their outer end in the direction of the vehicle rear 27, as is indicated in the exemplary embodiment in FIG. 1 with its dash-dotted longitudinal axes 10.

An angle α of the longitudinal axes 10 of the bushings 5 in a range from approximately 15° to approximately 30° has the advantage with a twist-beam axle 1 without Watt linkage, that the lateral force oversteer can be reduced. An angle α of the longitudinal axes 10 of the bushings 5 in a range from approximately −15° to approximately +15° and in particular of approximately 0° (in this case the two longitudinal axes 10 lie on a common axis, which corresponds to the transverse axis of the vehicle, as is indicated in FIG. 1 with the dotted line) has the advantage with a twist-beam axle 1 with Watt linkage that the bushings 5 are subjected to torsional but not cardanic load.

Furthermore, the A-bushing 5 with its outer sleeve 6 is fastened in a holder 11 for the A-bushing. To this end, the A-bushing 5 is for example crimped or pressed in the holder 11 of the A-bushing. The holder 11 for the A-bushing in turn is provided fastened to the vehicle body or vehicle structure. To this end, the holder 11 for the A-bushing is screwed to the vehicle body for example by means of screws, as is illustrated in the exemplary embodiment in FIG. 1.

With this concept, a higher position of the A-bushing 5 is possible, since other than in the previously known concepts no corresponding free space has to be provided between the link and the body for the movement of the A-bushing. Apart from this, the middle of the A-bushing 5 can be positioned higher in the net than the center of the wheel. As is shown in the exemplary embodiment in FIG. 1, the A-bushing 5 with its longitudinal axis 10 lies above the axis 12, which runs through the wheel center of the wheel suspensions 4, which is indicated by a dashed line in FIG. 1. This results in an improved inclined spring suspension. When running over an obstacle, the wheel can yield to the back which results in a greater comfort.

With the holder 11 for the A-bushing, a stiffer body connection can be additionally provided. This leads to lower mobility, which has a positive influence on the noise transfer into the vehicle interior, which likewise increases the comfort further. In addition, a lighter body structure is possible.

As is shown in the exemplary embodiment in FIG. 1, the twist-beam axle 1 is equipped on each side with a spring absorber device 13. The spring absorber device 13 in this case is designed in such a manner that it is inserted in the body frame of the vehicle from below and fastened there. To this end, the spring absorber device 13, as is also shown in the following FIG. 3 and FIG. 4, comprises a dome element 14, in which an absorber 15 is received. The dome element 14 is connected at a first or upper end to an absorber mounting device 16 of the absorber 15 and is inserted in the body with the absorber mounting device 16 and fastened to the vehicle body by means of fastening means of the absorber mounting device, such as for example screws or threaded pins.

Furthermore, the dome element 14 at its second or lower end comprises a lower fastening plate 17, with which the dome element 14 at its second end is fastened to the vehicle body. The dome element 14 in this case additionally has an upper spring seat 19 at its second end for receiving a spring element 18, e.g., a coil spring of the spring absorber device 13. On the absorber 15, a lower spring seat 20 is additionally provided for receiving the other end of the spring element 18.

The absorber 15, e.g., a spring strut shock absorber, comprises a cylinder piston arrangement 21 in its fundamental construction, whose cylinder can be connected in an articulated manner via a bushing 22, e.g., a rubber-metal bushing, to the chassis and its piston rod by means of the upper absorber mounting device 16. However, the embodiments are not restricted to this specific absorber 15. The absorber 15 of the spring absorber device 13 can be a standard absorber. Likewise, the absorber 15 can for example also be an absorber that is adjustable in steps or steplessly. Furthermore, the absorber can also be a part-carrying absorber, e.g., a Nivomat.

As is shown in the exemplary embodiment in FIG. 1, the respective spring absorber device 13 is preferentially arranged between the torsion profile or the cross brace 3 and the axis 12, which runs through the wheel center. With the spring absorber device 13 within the body frame, a stiffer and thus lighter body structure can be achieved. In that the absorber 15 of the spring absorber device 13 is located below the loading floor, a large through-loading width is achieved, so that a user can utilize a larger loading space.

Assembling the spring absorber device 13 into the body, i.e., the so-called wedding, is also simpler than with separated spring and absorber, since only one component instead of two has to be positioned. Since spring forces, absorber forces and buffer forces are introduced into the axle of the trailing arms of the twist-beam axle at one point, the axle or the trailing arm of the twist-beam axle can be embodied in a weight-optimized manner. Only one point has to be embodied stiff Since absorber forces and spring forces are added, a substantially increasing load compared with an alternating load in the previously known absorber arrangement materializes.

Since the spring or the spring element 18 no longer rests directly on the link or trailing arm 2, the previous quite heavy spring cup or spring seat can be omitted. In the case of for example a gray cast iron link, approximately 2 kg for each axle are omitted. Compared with this, the spring cup on the left and right absorber of the spring absorber device only weighs approximately 0.8 kg for each axle.

Because of the kinematics of the spring or the spring element 18 of the spring absorber device 13, this results in an angular deflection of for example approximately 12° compared with approximately 29° between the upper and lower spring cup or the upper and lower spring seat 19, 20 that is smaller than is the case with the previous axle. The spring or the spring element 18 of the spring absorber device 13 thus acts more effectively and there are advantages in the configuration of the spring.

As is additionally shown in the exemplary embodiment in FIG. 1, the twist-beam axle 1 comprises, for example, a Watt linkage 23. However, in other embodiments according to the invention, the twist-beam axle 1 can also have no Watt linkage. The Watt linkage 23 in this case comprises a first and a second Watt link 24, which are articulated with one end each on a central link 25 and with the other end each on the associated trailing arm 2.

In the exemplary embodiment as shown in FIG. 1, the Watt linkage 23 is embodied for example in an arrowed manner. Here, the central link 25 is arranged displaced for example in a horizontal plane of the vehicle in the direction of the vehicle front 26, in order to form the arrowed Watt linkage 23. Through the arrowed Watt linkage 23, an increased lateral force understeer can be achieved in embodiments. Likewise, the central link 25 can be arranged for example displaced in a horizontal plane of the vehicle in the direction of the vehicle rear 27 in order to form the arrowed Watt linkage. The Watt linkage 23 however need not necessarily be of the arrowed design but the central link 25 can also lie with the Watt links 23 in a common plane, particularly common horizontal plane.

As is illustrated in the exemplary embodiment in FIG. 1, a Watt linkage holder 28 for the Watt linkage 23 is provided, wherein the Watt linkage holder 28 is fastened to a body cross member (not shown) of the vehicle body. Thus, this Watt linkage holder 28 can be configured compact, light and cost-effective compared with previously known concepts. The Watt linkage holder 28, as is illustrated in the exemplary embodiment in FIG. 1, is connected to the central link 25 and its fulcrum, about which the central link 25 rotates. The Watt linkage holder 28 in this case comprises two arms 29 as shown in the exemplary embodiment in FIG. 1, which extend for example transversely to the longitudinal direction of the vehicle or along the body cross member in order to be fastened to the body cross member, for example through screwing with screws 30. Through the compact Watt linkage holder 28, the stiffness and the natural frequency of the back vehicle are disturbed only to a very minor part.

In addition, in the exemplary embodiment shown in FIG. 1, the cross brace 3 or the torsion profile can be or is fastened to the trailing arms 2 in a predefined position. To this end, the cross brace 3 or the torsion profile is arranged in the predefined position or turned into the predefined position and then connected to the trailing arms 2, e.g., welded. The predefined position of the cross brace 3 or of the torsion profile can for example be selected dependent on a desired roll center height and/or roll control. The cross brace 3 or the torsion profile comprises a cylindrical section 41 each at its ends in order to be rotated, which can be received in a corresponding cylindrical section 42 of the respective trailing arm 2. The cross brace 3 or the torsion profile is rotated into the corresponding predefined position and then fastened to the trailing arms 2. The cross brace 3 or the torsion profile and their connection to the trailing arms 2 can also be designed in such a manner that they can only be interconnected in one position.

Figure 2:
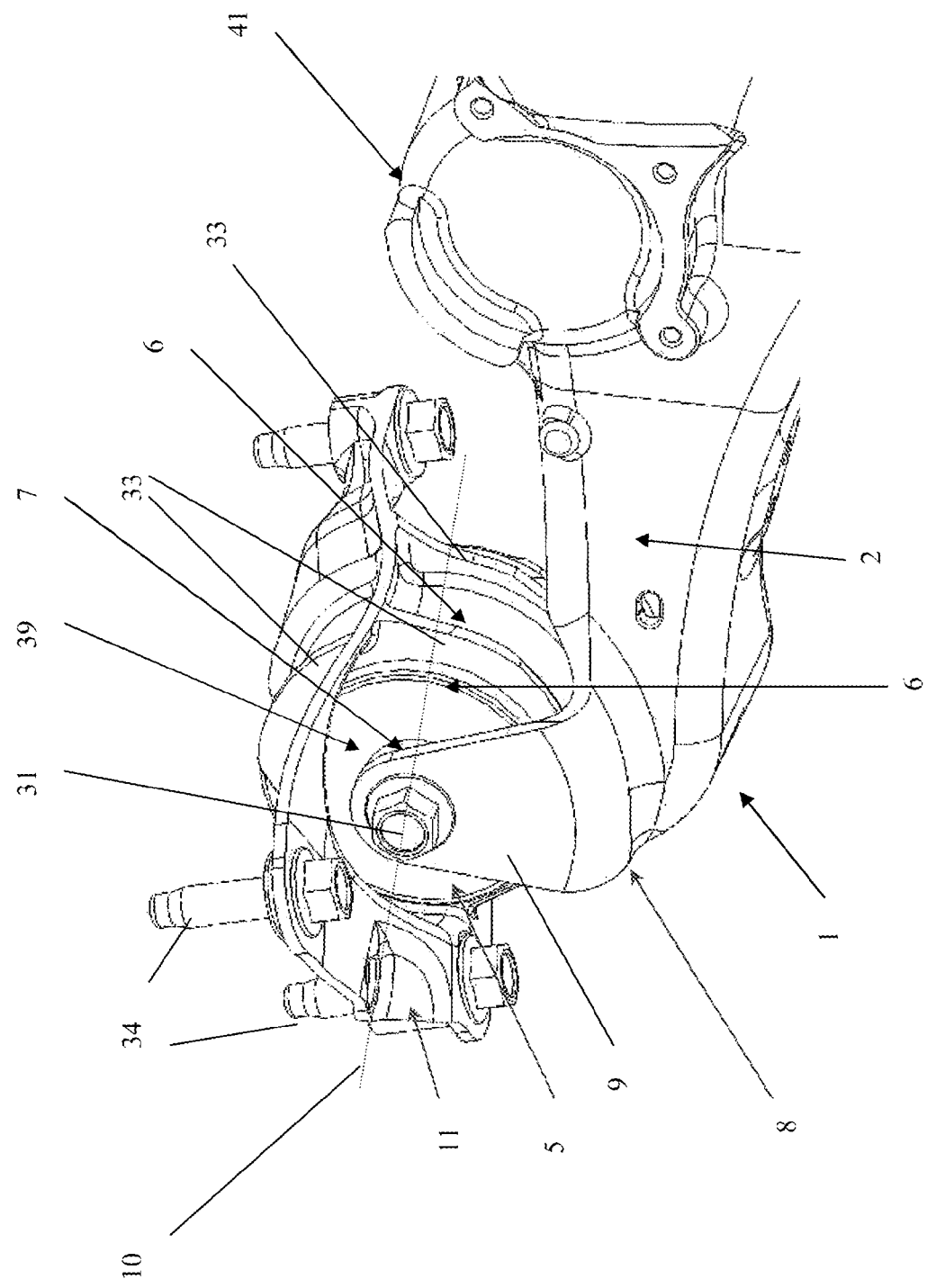
FIG. 2 is a perspective view a detail of the suspension of the vehicle axle with the twist-beam axle according to FIG. 1.

FIG. 2 shows a perspective view of a detail of the twist-beam axle 1 according to FIG. 1. Here, the one end of one of the trailing arms 2 of the twist-beam axle 1 is illustrated. The trailing arm 2 in this case is connected at its end to the inner sleeve 7 of the A-bushing, while the A-bushing 5 with its outer sleeve 6, e.g. a metal sleeve, is connected to the holder 11 for the A-bushing, i.e., connected in a fixed manner, for example pressed into the holder 11.

As described previously and shown in FIG. 2, the trailing arm 2 comprises a connecting element 8 for connecting the trailing arm 2 to the A-bushing 5. The connecting element 8 for example is designed in the form of a fork-shaped or U-shaped mount 9 and for example embodied unitarily with the trailing arm 2. The A-bushing 5 in this case is arranged or received in the fork-shaped or U-shaped mount 9, wherein the fork-shaped or U-shaped mount 9 on both ends of the A-bushing 5 is connected to the inner sleeve 7 of the latter in such a manner that the trailing arm 2 is pivotable or rotatable about the A-bushing 5 or its longitudinal axis 10. To this end, the connecting element 8, as shown in the embodiment in FIG. 2, is connected to the axle of the A-bushing 5 in a pivotable manner and the axle is locked to the fork-shaped or U-shaped mount 9 by means of a respective nut 31.

The A-bushing 5, as previously described with preference to FIG. 1, is arranged with its longitudinal axis 10 for example transversely to the longitudinal axis of the vehicle in a horizontal vehicle plane. However, the invention is not restricted to this arrangement of the A-bushing 5 and its axis but the A-bushing 5 can also have any other position, depending on the direction in which the twist-beam axle 1 with its trailing arms 2 is to be pivoted. An example is indicated in FIG. 1 with a dash-dotted line.

The holder 11 for the A-bushing is designed in such a manner, as is shown in the exemplary embodiment in FIG. 2, that the A-bushing 5 can be received in and pressed into the holder 11. To this end, the holder 11, as is illustrated in the exemplary embodiment in FIG. 2, can be designed as a sleeve 32, in which the bushing 5 is inserted and pressed into the sleeve 32 from a side. Here, the sleeve 32 can be optionally provided with one or a plurality of reinforcing ribs 33 as shown in the exemplary embodiment in FIG. 2. As described before, the bushing 5 can comprise an outer sleeve 6, an inner sleeve 7 and an intermediate layer 39. The holder 11 for the A-bushing is fastened to the vehicle body or vehicle structure for example screwed to the latter in a fixed manner by means of screws 34.

FIG. 3 and FIG. 4 show a sectional view through a spring absorber device 13 of the twist-beam axle 1 according to FIG. 1. In FIG. 3, a cylinder piston arrangement 21 of the absorber 15 with a protective tube 35 is shown. This is omitted in FIG. 4 for the sake of clarity in order to show a buffer 36 and a piston rod 37 of the absorber 15, which are otherwise concealed by the protective tube 35.

As described before, the spring absorber device 13 comprises an absorber 15, e.g. a spring strut shock absorber. In its basic construction, the latter has a cylinder piston arrangement 21 the cylinders of which can be connected to the chassis in an articulated manner via a bushing 22, e.g., a rubber-metal bushing. As is shown in FIGS. 3 and 4, an eye 38 of the absorber 15 is fastened to the trailing arm 2.

The piston rod 37 of the cylinders of the absorber 15 can be connected to the vehicle body by means of the upper absorber mounting device 16. As is shown in FIG. 4, the buffer 36 in this case is provided below the absorber mounting device 16 for the cylinder for damping forces that occur. Here, the absorber 15 with its absorber mounting device 16 is received in the dome element 14. The absorber mounting device 16 in this case is connected to the first end of the dome element 14 and is fastened to the body with the dome element 14 via suitable fastening means, e.g., screwed. The dome element 14 is additionally fastened to the body on its second, lower end via its fastening plate 17.

As is shown in FIG. 3 and FIG. 4, the spring absorber device 13 additionally comprises a spring element 18, e.g., a coil spring, which is received in an upper spring seat 19 of the dome element 14 and a lower spring seat 20, which is formed on the absorber 15 or connected to the latter.

According to an embodiment, the twist-beam axle 1 comprises a torsion profile 3, which can be produced from steel tube. The trailing arms 2 are for example produced from gray cast iron or from a light metal, such as for example aluminum and connected to the torsion profile 3. This applies to all the embodiments. In addition, the torsion profile 3 of the twist-beam axle 1 can consist of or be produced from steel tube or steel plate, wherein the trailing arms 2 are produced from steel plate, unitarily or in multiple parts and connected to the torsion profile 3. This applies also to all embodiments.

Furthermore, the torsion profile 3 can be guided rotatably to the trailing arms 2 before joining to the trailing arms in order to influence the roll center height and the roll control. The torsion profile 3 however can also be fastened to the trailing arms 2 in a non-adjustable manner, as with the previously described combinations of twist-beam axle 1 and trailing arms 2. This applies also to all embodiments.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A suspension of a twisted beam axle for a body of a vehicle, comprising:
   a cross member of the body of the vehicle;
   a Watt linkage;
   having two trailing arms connected to the Watt linkage, wherein the Watt linkage further comprises a Watt linkage holder that is configured to connect the Watt linkage to the cross member of the body;
   a brace interconnecting the two trailing arms;
   a mounting device for each of the two trailing arms that is configured for a rotatable fastening of the twist-beam axle to the body of the vehicle;
   a bushing formed on at least one trailing arm of the two trailing arms; and
   a connecting element of the bushing that is also formed on at least one trailing arm of the two trailing arms and into which the bushing is received in such a manner that the twist-beam axle is configured to pivot about a longitudinal axis of the bushing; and
   a holder fastened to the bushing that is configured to connect to the body of the vehicle, the axis of the bushing being arranged in a horizontal vehicle plane.

2. The suspension according to claim 1, wherein the Watt linkage holder is a sleeve into which the bushing is pressed, and
   wherein the sleeve comprises at least one reinforcing rib.

3. The suspension according to claim 1, wherein the bushing with the longitudinal axis is arranged higher in the vehicle than an axis through a wheel center of a wheel suspension of the two trailing arms.

4. The suspension according to claim 1, wherein the connecting element is fork-shaped.

5. The suspension according to claim 1, wherein the connecting element is a U-shaped mount.

6. The suspension according to claim 1, wherein the connecting element is unitarily connected with at least one of the two trailing arms.

7. The suspension according to claim 1, wherein the Watt linkage holder is connected to a central link of the Watt linkage and comprises two arms that are configured to fasten to the cross member of the body.

8. The suspension according to claim 1, wherein a cross brace of the twist-beam axle is a torsion profile that is stiff to bending and torsionally soft.

9. The suspension according to claim 1, wherein a cross brace is rotatable relative to the two trailing arms.

10. The suspension according to claim 1, wherein a cross brace is provided on the two trailing arms in a fixed position and non-adjustable.

11. The suspension according to claim 1, wherein the two trailing arms are at least partially formed from a gray cast iron.

12. The suspension according to claim 1, wherein the two trailing arms are at least partially formed from a steel plate.

13. The suspension according to claim 1, wherein the two trailing arms are at least partially formed from a light metal.

14. The suspension according to claim 1, wherein the two trailing arms are at least partially formed from an aluminum.

15. The suspension according to claim 1, wherein the two trailing arms are at least partially formed from an aluminum alloy.

16. A suspension of a twisted beam axle for a body of a vehicle, comprising:
   two trailing arms;
   a spring absorber device fastened to one of the two trailing arms, the spring absorber device further comprising:
      an absorber with an absorber mounting device and a spring seat;
      a dome element with a first end and a second end,
         wherein the absorber is received and is connected to the absorber mounting device, and is also fastenable to the body with the absorber mounting device at the first end,
         wherein further the second end comprises another spring seat, which is fastened to the body of the vehicle, and
      a spring element that is received in the spring seat of the dome element and the spring seat of the absorber;
   a brace interconnecting the two trailing arms;
   a mounting device for each of the two trailing arms that is configured for a rotatable fastening of the twist-beam axle to the body of the vehicle;
   a bushing formed on at least one trailing arm of the two trailing arms; and
   a connecting element of the bushing that are also formed on at least one trailing arm of the two trailing arms and into which the bushing is received in such a manner that the twist-beam axle is configured to pivot about a longitudinal axis of the bushing; and
   a holder fastened to the bushing that is configured to connect to the body of the vehicle, the axis of the bushing being arranged in a horizontal vehicle plane.

* * * * *